Patented Nov. 24, 1936

2,061,593

UNITED STATES PATENT OFFICE 2,061,593

METHOD OF PRODUCING NUCLEAR ALKYLATED AROMATIC COMPOUNDS

Jack D. Robinson, Buffalo, N. Y., assignor to National Aniline & Chemical Company, Inc., New York, N. Y., a corporation of New York No Drawing. Application March 5, 1934, Serial No. 714,096

19 Claims. (Cl. 260—154)

This invention relates to the production of nuclear alkyl derivatives of aromatic compounds, and more particularly to a method of substituting an alkyl group, and especially an alkyl group which contains a relatively large number of carbon atoms, for a hydrogen atom attached to a nuclear carbon atom of an aromatic compound. It relates especially to a method of substituting a hydrogen atom attached to a nuclear carbon atom of a phenol of the benzene or naphthalene series by an aliphatic hydrocarbon radical containing from 8 to 30 carbon atoms.

The nuclear alkyl derivatives of aromatic compounds, and especially the alkyl derivatives of the phenols of the benzene and naphthalene series which contain 8 to 30 carbon atoms in an aliphatic hydrocarbon chain, find application in the arts for a number of purposes. For example, they may be used directly as ingredients of insecticides or germicides, as solvents, oil bases and the like and further they are of particular value when sulfonated, the sulfonation products yielding valuable detergent and wetting agents useful in the textile and laundry or related fields, as well as insecticidal, fungicidal, emulsifying, dispersing, precipitating, and/or tanning agents.

I have found that the alkylation of aromatic compounds, and particularly of phenols of the benzene and naphthalene series, for the production of nuclear alkyl derivatives thereof can be brought about by treating the aromatic compound to be alkylated with an alkyl ester of a fatty acid, more particularly of a saturated monocarboxylic fatty acid, the alkyl group of which ester corresponds with the alkyl group desired to be introduced into the aromatic compound, in the presence of an acidic condensing agent and preferably a metal halide condensing agent. I have further found that the resulting nuclear alkyl aromatic compound can be separated from the crude reaction product by fractional distillation, preferably under a relatively high vacuum.

My invention is of particular advantage in that it permits the production of relatively long chain nuclear alkyl derivatives of aromatic compounds from naturally occurring and relatively cheap materials containing fatty acid esters, such as spermaceti, wool wax, beeswax, carnauba wax, Arctic sperm oil, flax wax, palm wax, Chinese wax, etc. Spermaceti consists mainly of cetyl palmitate. Wool wax contains ceryl and melissyl myristate, beeswax contains myricyl palmitate, carnauba wax is chiefly myricyl melissate, Arctic sperm oil contains lauryl oleate, flax wax contains ceryl palmitate, palm wax contains melissyl melissate, and Chinese wax is mostly ceryl cerotate. My invention is not limited, however, to the employment of such naturally occurring esters but includes the employment as alkylating agents for aromatic compounds of other esters of saturated monocarboxylic fatty acids and monohydric alcohols, whether said esters occur naturally or are produced synthetically.

The invention will be illustrated by the following specific examples in which the parts are by weight and temperatures are in degrees centigrade. It will be understood that the scope of the invention is not limited to these specific examples.

*Example 1.*—2 parts of spermaceti, 1 part of phenol, and 1 part of zinc chloride are agitated and heated under a reflux condenser at approximately 185° for about 16 hours. The mixture is diluted with water, and the oily portion is separated and washed first with dilute hydrochloric acid and then with water until reasonably free from water soluble products. The resulting oil is fractionally distilled in vacuo. The fraction boiling from 230° to 260° at 13 mm. is collected separately. It consists chiefly of cetyl phenol.

*Example 2.*—200 parts of spermaceti and 50 parts of phenol are mixed thoroughly, and to this mixture 80 parts of aluminum chloride (anhydrous) are added in small portions so that the temperature of the reaction mass does not exceed 100°. The mixture is held at about 100° for about one hour after the last addition of aluminum chloride. Thereafter, the temperature is raised to 150° to 175° and held there over a period of about 2 hours. The mixture is then heated rapidly to about 225°, held there for 20 minutes, cooled and diluted with water. The oil is separated, washed with dilute hydrochloric acid and water till reasonably free from water soluble products, and then vacuum distilled. The fraction boiling from 230° to 265° at 13 mm. pressure is collected. It is chiefly cetyl phenol.

*Example 3.*—300 parts of spermaceti, 150 parts phenol, 75 parts zinc chloride, and 12 parts of concentrated hydrochloric acid are mixed and heated to boiling under a reflux condenser for 18 hours. The mixture is then diluted with water and the oily portion is washed with water till practically free from water soluble impurities. The resulting oil is fractionally distilled in vacuo. The fraction boiling from 230° to 265° at 13 mm. is collected. It is chiefly cetyl phenol.

*Example 4.*—A mixture of 200 parts of carnauba wax, 100 parts of phenol and 100 parts of zinc chloride is heated under a reflux condenser at about 180° for approximately 18 hours. The condensation mass is diluted with water, and 100 parts of benzene which acts as a flux. The oily mass is washed with water until reasonably free from water-soluble products. The oil remaining is distilled in vacuo. The fraction boiling from 290° to 320° at 5 mm. pressure is collected. It is a yellow wax-like solid, comprising chiefly cetyl phenol.

While the above examples relate to the alkylation of phenol with the aid of zinc chloride or aluminum chloride as condensing agents, it is to be understood that my invention is not limited thereto. Thus, my invention generically includes the alkylation of benzene, napthalene and their derivatives, as for example those containing one or more halogen atoms and/or alkyl, alkoxy, hydroxy, carboxy, and/or other radicals as nuclear substitutents. My invention is of importance in connection with the production of nuclear alkyl derivatives of phenols of the benzene and naphthathalene series (including those which contain one or more of the said atoms or radicals as nuclear substitutents, as well as those which are further unsubstituted, especially the latter), particularly those in which the nuclear alkyl group contains 8 to 30 carbon atoms in a saturated aliphatic hydrocarbon chain; and it is of especial value in connection with the production of nuclear alkyl phenols and cresols in which the alkyl group is a saturated aliphatic hydrocarbon chain containing at least 12 carbon atoms. My invention further includes the use of acidic condensing agents, and especially metal halide condensing agents, as for example, zinc chloride, aluminum chloride, ferric chloride, stannic chloride and titanium chloride, as well as mixtures of two or more of said condensing agents. It also includes the use of a small amount of an acid, such as concentrated hydrochloric acid, in addition to the metal halide condensing agent.

My invention is not limited, furthermore, to the use of alkyl esters in which the alkyl group is an aliphatic hydrocarbon radical, but includes alkyl esters in which the alkyl group contains an aryl group (as for example, phenyl, tolyl, etc.) as a substituent, which species of alkyl group is sometimes referred to as an "aralkyl" group. Thus, for example, the invention includes the employment of a benzyl ester of a fatty acid for the production of a benzyl derivative of an aromatic compound.

The step of fractional distillation in vacuo of the reaction product is of particular advantage in separating the alkyl aromatic compounds from impurities such as uncombined reagents and decomposition products which may be present, as well as from by-products of the nature of ketones which may be formed by the condensation of the aromatic compound with the organic acid produced as a by-product of the reaction. Thus, in the foregoing Examples 1, 2 and 3, the vacuum distillation serves to separate the desired cetyl phenol from palmitoyl phenol produced as a by-product by the action of the palymitic acid formed in the process.

I claim:

1. The improvement in the method of producing a nuclear alkyl derivative of an aromatic compound by alkylation of an aromatic compound capable of being alkylated, which comprises reacting the aromatic compound with an alkyl ester of a fatty acid, the alkyl group of which is selected from the group consisting of the higher alkyl and aralkyl radicals in the presence of a condensing agent.

2. The improvement in the method of producing a nuclear alkyl derivative of an aromatic compound by alkylation of an aromatic compound capable of being alkylated, which comprises reacting the aromatic compound with an alkyl ester of a fatty monocarboxylic acid, the alkyl groups of which is selected from the group consisting of the higher alkyl and aralkyl radicals in the presence of an acidic condensing agent.

3. The improvement in the method of producing a nuclear alkyl derivative of an aromatic compound by alkylation of an aromatic compound capable of being alkylated, which comprises reacting the aromatic compound with an alkyl ester of a fatty monocarboxylic acid, the alkyl group of which is selected from the group consisting of the higher alkyl and aralkyl radicals in the presence of a metal halide condensing agent.

4. The improvement in the method of producing a nuclear alkyl derivative of a hydroxy aromatic compound by alkylation of the hydroxy aromatic compound, which comprises reacting the hydroxy aromatic compound with the corresponding alkyl ester of a saturated fatty monocarboxylic acid, the alkyl group of which is selected from the group consisting of the higher alkyl and aralkyl radicals in the presence of an acidic condensing agent.

5. The improvement in the method of producing a nuclear alkyl derivative of a hydroxy aromatic compound by alkylation of the hydroxy aromatic compound, which comprises heating a reaction mixture containing the hydroxy aromatic compound, the corresponding alkyl ester of a fatty monocarboxylic acid, the alkyl group of which is selected from the group consisting of the higher alkyl and aralkyl radicals, and a condensing agent, whereby a reaction product containing the nuclear alkyl derivative of the aromatic compound is produced, and recovering the nuclear alkyl derivative of the aromatic compound by vacuum distillation of said reaction product.

6. The improvement in the method of producing a nuclear alkyl derivative of a hydroxy aromatic compound by alkylation of the hydroxy aromatic compound, which comprises reacting a phenol of the benzene and naphthalene series with a higher alkyl ester of a fatty monocarboxylic acid in the presence of a metal halide condensing agent.

7. The improvement in the method of producing a nuclear alkyl derivative of a hydroxy aromatic compound by alkylation of the hydroxy aromatic compound, which comprises reacting a phenol of the benzene and naphthalene series with an alkyl ester of a saturated fatty monocarboxylic acid, the alkyl group of which contains 8 to 30 carbon atoms in an aliphatic hydrocarbon chain, in the presence of a metal halide condensing agent.

8. The method of producing a nuclear alkyl derivative of a phenol of the benzene series which comprises heating the phenol with a higher alkyl ester of a saturated fatty monocarboxylic acid in the presence of a metal chloride condensing agent.

9. The method of producing a nuclear alkyl phenol which comprises heating phenol with an alkyl ester of a saturated fatty monocarboxylic acid, the alkyl group of which contains 8 to 30 carbon atoms in an aliphatic hydrocarbon chain, in the presence of a metal chloride condensing agent.

10. The process of producing cetyl phenol which comprises reacting phenol with spermaceti in the presence of a metal chloride condensing agent.

11. The improvement in the method of producing a nuclear alkyl derivative of an aromatic compound by alkylation of an aromatic compound, which comprises reacting an aromatic compound capable of being alkylated with an alkyl ester of a fatty acid, the alkyl group of which contains 8 to 30 carbon atoms in an aliphatic hydrocarbon chain, in the presence of a condensing agent.

12. The improvement in the method of producing a nuclear alkyl derivative of an aromatic compound by alkylation of an aromatic compound, which comprises reacting an aromatic compound capable of being alkylated with an alkyl ester of a fatty monocarboxylic acid, the alkyl group of which contains 8 to 30 carbon atoms in an aliphatic hydrocarbon chain, in the presence of an acidic condensing agent.

13. The improvement in the method of producing a nuclear alkyl derivative of an aromatic compound by alkylation of an aromatic compound, which comprises reacting an aromatic compound capable of being alkylated with an alkyl ester of a fatty monocarboxylic acid, the alkyl group of which contains at least 12 carbon atoms in an aliphatic hydrocarbon chain, in the presence of a metal halide condensing agent.

14. The improvement in the method of producing a nuclear alkyl derivative of a hydroxy aromatic compound by alkylation of the hydroxy aromatic compound, which comprises reacting the hydroxy aromatic compound with the corresponding alkyl ester of a saturated fatty monocarboxylic acid, the alkyl group of which contains 8 to 30 carbon atoms in an aliphatic hydrocarbon chain, in the presence of an acidic condensing agent.

15. The method of producing a nuclear alkyl derivative of a phenol of the benzene series which comprises heating the phenol with the corresponding alkyl ester of a saturated fatty monocarboxylic acid, the alkyl group of which contains 8 to 30 carbon atoms in an aliphatic hydrocarbon chain, in the presence of a metal chloride condensing agent.

16. The improvement in the method of producing a nuclear alkyl derivative of a phenol of the benzene series which comprises heating the phenol with a naturally occurring wax comprising the corresponding alkyl ester of a saturated fatty monocarboxylic acid, the alkyl group of which contains at least 12 carbon atoms in an aliphatic hydrocarbon chain, in the presence of a metal halide condensing agent.

17. The improvement in the method of producing a nuclear alkyl derivative of an aromatic compound by alkylation of an aromatic compound capable of being alkylated, which comprises reacting the aromatic compound with an alkyl ester of a higher fatty monocarboxylic acid, the alkyl radical of which is selected from the group consisting of the higher alkyl and aralkyl radicals, in the presence of an acidic condensing agent.

18. The improvement in the method of producing a nuclear alkyl derivative of an aromatic compound by alkylation of an aromatic compound capable of being alkylated, which comprises reacting the aromatic compound with a higher alkyl ester of a higher fatty monocarboxylic acid, in the presence of an acidic condensing agent.

19. The method of producing a nuclear alkyl derivative of a phenol of the benzene series, which comprises heating the phenol with the corresponding higher alkyl ester of a saturated higher fatty monocarboxylic acid, in the presence of a metal halide condensing agent.

JACK D. ROBINSON.